_
3,055,803
DIYNE DIOLS AS BIRD REPELLENTS
Lyle D. Goodhue, Bartlesville, and Kenneth E. Cantrel, Dewey, Okla., assignors to Phillips Petroleum Company, a corporation of Delaware
No Drawing. Filed May 22, 1959, Ser. No. 814,960
19 Claims. (Cl. 167—46)

This invention relates to repelling birds. In one of its aspects, this invention relates to a method for repelling birds which comprises subjecting the locus from which the birds are to be repelled to the action of an alkyne diol compound. In another of its aspects, this invention relates to a novel bird repellent composition comprising, as a principal active ingredient thereof, an alkyne diol compound. In still another of its aspects, this invention relates to a method for protecting seeds from attack and injury by birds which comprises treating said seeds with an alkyne diol compound and then planting said treated seeds.

A number of repellents for certain pests, such as insects and rodents, have been developed and are known in the art. However, very little success has been attained in the search for a material which is repellent to birds. It is desirable for many applications to repel birds from certain areas and surfaces. For instance, the loss of grain at the present time because of consumption by birds represents a large financial loss in this country each year. Also, as is well known, many birds are architectural pests.

Accordingly, it is thus an object of this invention to provide an improved method for repelling birds. It is another object of this invention to provide a method for rendering surfaces repellent to birds. It is still another object of this invention to provide a composition for repelling birds. Another object of this invention is to protect seeds and grain from being eaten or injured by birds.

Other aspects, objects and the several advantages of this invention are apparent from a study of this disclosure and the appended claims.

According to the present invention, we have discovered that birds are repelled by alkyne diol compounds having the structural formula $$\text{HO—R—C} \equiv \text{C—C} \equiv \text{C—R—OH}$$

wherein R is selected from the group consisting of alkylene radicals containing from 1 to 6 carbon atoms, cycloalkylene radicals containing from 5 to 10 carbon atoms, and

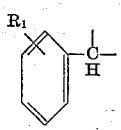

wherein $R_1$ is selected from the group consisting of hydrogen and alkyl radicals containing from 1 to 4 carbon atoms and wherein the R's can be alike or different.

Some examples of specific alkyne or diyne diol compounds of the above-described general structural formula which can be employed as bird repellents in practicing the present invention are:

2,7-dimethyl-3,5-octadiyne-2,7-diol
2,4-hexadiyne-1,6-diol
1,4-di(1-hydroxycyclohexyl)-1,3-butadiyne
7,9-hexadecadiyne-1,16-diol
1,4-di(3-ethyl-α-hydroxybenzyl)-1,3-butadiyne
1,4-di(4-n-propyl-α-hydroxybenzyl)-1,3-butadiyne
1,4-di(α-hydroxybenzyl)-1,3-butadiyne
1,4-di(1-hydroxy-3-n-butylcyclohexyl)-1,3-butadiyne
1,4-di(1-hydroxycyclopentyl)-1,3-butadiyne
1,4-di(1-hydroxy-2-methylcyclohexyl)-1,3-butadiyne
2,9-dimethyl-4,6-decadiyne-1,10-diol
3,5-nonadiyne-1,9-diol
1-phenyl-2,4-heptadiyne-1,7-diol
1,4-di(4-hydroxycyclohexyl)-1,3-butadiyne and the like.

The bird repellent compounds of the present invention can be applied for their intended purpose as a concentrate, or in combination with a carrier or other inert materials. Solvent or adjuvant carriers employed should be substantially inert with respect to the active repellent compound. Some examples of specific carrier materials which can be employed are acetone, deodorized kerosene, naphthas, isoparaffinic hydrocarbon fractions boiling in the range of about 260 to about 800° F. (Soltrol) and the like. If desired, the bird repellents of this invention can be applied as aqueous emulsions by employing a suitable emulsifying agent.

Also, according to the present invention, the diyne diols described above and used in the method of this invention can be composited with solids to provide novel bird repellent compositions. Solids can comprise soil, sand, clays, seeds, grain and, generally, various adsorptive solids preferably in subdivided form. Bird repellents of this invention can also be applied to surfaces from which it is desired to repel birds in conjunction with an adhesive.

The repellents of this invention can be applied in the above-described forms by spraying, brushing, dusting, and the like. One preferred method of application is to spray a liquid composition containing these repellents onto the surface from which birds are to be repelled. When the repellents are applied in a solvent or adjuvant carrier, the liquid compositions normally contain from 0.1 to 10 weight percent of at least one of the above-described diyne diols, although concentrations above and below this range can be effectively employed. When the repellent is applied in the form of a dust, the concentration of diyne diol is usually within the range of from about 1 to about 20 weight percent.

The repellents of this invention are usually applied to a surface in a manner so as to deposit an amount within the range between about 0.5 and about 100 grams of the active repellent material per 100 square feet of surface from which birds are to be repelled, preferably between 5 and 25 on the same basis. Larger or smaller amounts, however, can be applied, if desired, although larger amounts are, generally, uneconomical.

When the repellents of this invention are applied to seeds, grain and the like, application is made so as to deposit between 0.05 and 5 weight percent, based on the seed or grain, of the active repellent. A more preferred range is from 0.1 to 2 weight percent.

The repellent compounds or materials of the present invention can be prepared by any method known in the prior art. One method of preparation of the diyne diols of this invention is to couple two molecules of an acetylenic alcohol by oxidative coupling. For example, 2,7-dimethyl-3,5-octadiyne-2,7-diol can be prepared by contacting 2-methyl-3-butyne-2-ol with oxygen in the presence of cuprous chloride.

Bird repellents of the present invention can be applied to many different types of surfaces which it is desired to render repellent to birds. For example, these materials can be applied to grain, fruit trees, seeds, tree seedlings, window ledges, and the like. In rendering seeds and grain repellent to birds, these may be coated with the active materials of the present invention by immersing or soaking the seeds or grain prior to planting in a solution containing a diyne diol. The materials of the present invention are well adapted for coating seeds since the materials are characterized by odors or taste that are so pronounced and repulsive that birds will not eat seeds treated with the above-described compounds. As illustrated by the specific examples, of the seeds treated with the materials of the present invention, few, if any, thus protected seeds were eaten even after three days.

The following examples illustrate the effectiveness of the compounds of the present invention but are not intended to limit the scope of the invention.

EXAMPLE I

Several runs were made in which certain diyne diols were tested as repellents for baby chickens. In these runs, a solution of ½ gram of the desired diyne diol in 20 ccs. of acetone was applied to 50 grams of chicken feed. The chicken feed was thoroughly mixed with this solution, after which the acetone was evaporated from the feed. Fifty grams of this treated feed were then placed in a cage with two hungry baby chickens, and grams of treated feed remaining at the end of three days were determined. Untreated feed was completely consumed before the end of the first day. The results of these runs are expressed below as Table I. Included in these runs are the results with anthraquinone, a known bird repellent.

Table I

| Diyne Diol Employed | Grams of Feed Left | | |
|---|---|---|---|
| | Estimated | | Actual |
| | 1st Day | 2nd Day | 3rd Day |
| 2,7-dimethyl-3,5-octadiyne-2,7-diol | 40 | 35 | 35 |
| 2,4-hexadiyne-6-diol | 35 | 32 | 24 |
| 1,4-di(1-hydroxycyclohexyl)-1,3e-butadiyne | 30 | 15 | 3 |
| 2,5-dimethyl-3-hexyne-2,5-diol | 10 | 0 | |
| 3,6-dimethyl-4-octyne-3,6-diol | 0 | | |
| Anthraquinone | 40 | 35 | 18 |

The first three compounds tested in the above example are representative of the repellents of this invention. The fourth compound tested, 2,5-dimethyl-3-hexyne-2,5-diol, and the fifth compound, 3,6-dimethyl-4-octyne-3,6-diol, are control runs, as these compounds contain only one triple bond each. The last compound tested, anthraquinone, is a known bird repellent, and it can be seen that two of the three compounds of this invention which were tested are superior to that material for this purpose.

EXAMPLE II

Another series of runs was carried out in which the bird repellents of this invention were tested as repellents for Coturnix quail.

In these tests, 100 grams of feed were treated with a solution of one gram of one of the diyne diols of this invention in 40 ccs. of acetone. The solvent was then evaporated, and the dried feed was placed in a cage with four Coturnix quail. The amount of feed remaining on the third day was determined by weighing, unless all the feed had been eaten. The quail ate all of the 100 grams on the first day in a control using untreated feed. The results of these runs are expressed below as Table II.

Table II

| Diyne diol employed: | Grams of feed left on third day, actual |
|---|---|
| 2,7-dimethyl-3,5-octadiyne-2,7-diol | 82 |
| 2,4-hexadiyne-1,6-diol | 73 |

In the above examples, it should be emphasized that the test is a very severe one, much more so than where a choice of treated or untreated seed is given. It is obvious from Example II that the repellents are very good ones, since very little feed was consumed by these voracious eaters over a three day period under starving conditions.

EXAMPLE III

A series of tests were carried out in which pans of treated and untreated grain were exposed to birds on the roof of a house located in a municipal area heavily frequented by sparrows, pigeons and other species of birds.

In these tests, 340 grams of sorghum grain was treated with a solution of 3.4 grams of 2,7-dimethyl-3,5-octadiyne-2,7-diol dissolved in 30 cc. of acetone. The solvent was then evaporated off, and the treated grain was placed in a pan in the above-described location. A pan containing the same amount of untreated grain was placed in the same location, and daily observations were made on the amount of grain which had been consumed by the birds. Since the untreated grain was consumed very rapidly, it was necessary to replenish the untreated grain a number of times.

During a period of 14 days, a total of 204 grams of the treated feed was consumed, while 3060 grams of the untreated grain was eaten. Thus, the amount of treated feed consumed amounted to only 6.7 percent of the amount of untreated feed which was consumed over the same period.

Reasonable variation and modification are possible within the scope of the foregoing disclosure and the appended claims to the invention, the essence of which is that it has been found that diyne diols of the structural formula described are repellent to birds.

We claim:

1. A method of repelling birds which comprises subjecting the locus from which the birds are to be repelled to the action of at least one diyne diol compound of the formula

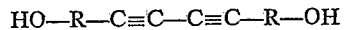

wherein R is selected from the group consisting of alkylene radicals containing from 1 to 6 carbon atoms, cycloalkylene radicals containing from 5 to 10 carbon atoms, and

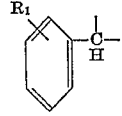

wherein $R_1$ is selected from the group consisting of hydrogen and alkyl radicals containing from 1 to 4 carbon atoms.

2. A method according to claim 1 wherein said compound is 2,7-dimethyl-3,5-octadiyne-2,7-diol.

3. A method according to claim 1 wherein said compound is 2,4-hexadiyne-1,6-diol.

4. A method of rendering a surface repellent to birds which comprises applying to said surface at least one diyne diol compound of the formula

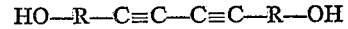

wherein R is selected from the group consisting of alkylene radicals containing from 1 to 6 carbon atoms, cycloalkylene radicals containing from 5 to 10 carbon atoms, and

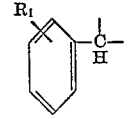

wherein $R_1$ is selected from the group consisting of hydrogen and alkyl radicals containing from 1 to 4 carbon atoms.

5. A method according to claim 4 wherein said compound is 2,7-dimethyl-3,5-octadiyne-2,7-diol.

6. A method according to claim 4 wherein said compound is 2,4-hexadiyne-1,6-diol.

7. A method of protecting seeds from attack by birds which comprises impregnating said seeds with at least one compound of the formula

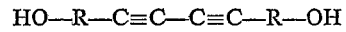

wherein R is selected from the group consisting of alkylene radicals containing from 1 to 6 carbon atoms, cycloalkylene radicals containing from 5 to 10 carbon atoms, and

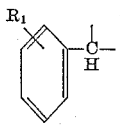

wherein $R_1$ is selected from the group consisting of hydrogen and alkyl radicals containing from 1 to 4 carbon atoms.

8. A method according to claim 7 wherein said compound is 2,7-dimethyl-3,5-octadiyne-2,7-diol.

9. A method according to claim 7 wherein said compound is 2,4-hexadiyne-1,6-diol.

10. A method of repelling birds from grain in the field which comprises treating said grain with a diyne diol compound of the formula

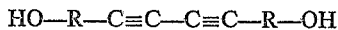

wherein R is selected from the group consisting of alkylene radicals containing from 1 to 6 carbon atoms, cycloalkylene radicals containing from 5 to 10 carbon atoms, and

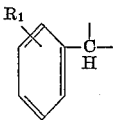

wherein $R_1$ is selected from the group consisting of hydrogen and alkyl radicals containing from 1 to 4 carbon atoms.

11. A method according to claim 10 wherein said compound is 2,7-dimethyl-3,5-octadiyne-2,7-diol.

12. A method according to claim 10 wherein said compound is 2,4-hexadiyne-1,6-diol.

13. A method of repelling birds from grain in the field which comprises treating said grain before planting with a diyne diol compound of the formula

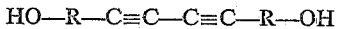

wherein R is selected from the group consisting of alkylene radicals containing from 1 to 6 carbon atoms, cycloalkylene radicals containing from 5 to 10 carbon atoms, and

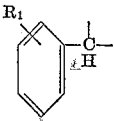

wherein $R_1$ is selected from the group consisting of hydrogen and alkyl radicals containing from 1 to 4 carbon atoms, and then planting said treated grain.

14. A method according to claim 13 wherein said compound is 2,7-dimethyl-3,5-octadiyne-2,7-diol.

15. A method according to claim 13 wherein said compound is 2,4-hexadiyne-1,6-diol.

16. A method for clearing an area of birds which comprises treating a bird food with an effective amount of a diyne diol compound of the formula

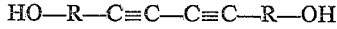

wherein R is selected from the group consisting of alkylene radicals containing from 1 to 6 carbon atoms, cycloalkylene radicals containing from 5 to 10 carbon atoms, and

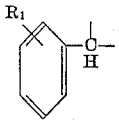

wherein $R_1$ is selected from the group consisting of hydrogen and alkyl radicals containing from 1 to 4 carbon atoms, and then distributing said treated food in an area from which the birds are to be cleared.

17. A method according to claim 16 wherein said compound is 2,7-dimethyl-3,5-octadiyne-2,7-diol.

18. A method according to claim 16 wherein said compound is 2,4-hexadiyne-1,6-diol.

19. A seed protected against ravaging or eating by birds, said seed having been impregnated according to the method of claim 7.

References Cited in the file of this patent

UNITED STATES PATENTS

| | | |
|---|---|---|
| 2,407,205 | Wilkes | Sept. 3, 1946 |
| 2,539,806 | Bergmann | Jan. 30, 1951 |
| 2,653,894 | Newman et al. | Sept. 29, 1953 |
| 2,712,560 | McKinley et al. | July 5, 1955 |
| 2,946,716 | Hessel | July 26, 1960 |